United States Patent
Pasqua, Jr. et al.

(10) Patent No.: US 7,351,370 B2
(45) Date of Patent: Apr. 1, 2008

(54) METHOD OF MAKING FILLER-IMPREGNATED GOLF BALL CORE

(75) Inventors: Samuel A. Pasqua, Jr., Tiverton, RI (US); Christopher Cavallaro, Lakeville, MA (US); William Morgan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 1028 days.

(21) Appl. No.: 10/309,613

(22) Filed: Dec. 4, 2002

(65) Prior Publication Data

US 2003/0083156 A1    May 1, 2003

Related U.S. Application Data

(60) Division of application No. 09/894,240, filed on Jun. 27, 2001, now abandoned, which is a continuation-in-part of application No. 09/883,423, filed on Jun. 18, 2001, now Pat. No. 6,562,909, which is a continuation-in-part of application No. 09/775,793, filed on Feb. 5, 2001, now Pat. No. 6,812,317, which is a continuation-in-part of application No. 09/625,544, filed on Jul. 25, 2000, now Pat. No. 6,749,789, which is a continuation of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.
*B29C 70/02* (2006.01)

(52) U.S. Cl. .............................. 264/328.1; 264/328.17; 264/328.18

(58) Field of Classification Search .................... None
See application file for complete search history.

(56) References Cited

U.S. PATENT DOCUMENTS

| | | | |
|---|---|---|---|
| 4,714,253 A | 12/1987 | Nakahara et al. | 273/228 |
| 4,863,167 A | 9/1989 | Matsuki et al. | 273/62 |
| 6,162,135 A * | 12/2000 | Bulpett et al. | 473/373 |
| 6,194,505 B1 * | 2/2001 | Sone et al. | 524/432 |
| 6,315,684 B1 | 11/2001 | Binette et al. | 473/377 |
| 6,465,546 B1 * | 10/2002 | Jackson et al. | 523/351 |

* cited by examiner

*Primary Examiner*—Edmund H. Lee
(74) *Attorney, Agent, or Firm*—William B. Lacy

(57) ABSTRACT

A method of making a golf ball core comprising the steps of providing a first polybutadiene pre-impregnated with at least about 50 weight percent of a first filler; providing a second polybutadiene substantially free of the first filler; providing a free radical initiator and a crosslinking agent; mixing the second polybutadiene, the free radical initiator, and the crosslinking agent with the first polybutadiene to form a polybutadiene blend; and molding the polybutadiene blend into the golf ball core.

16 Claims, No Drawings

US 7,351,370 B2

METHOD OF MAKING FILLER-IMPREGNATED GOLF BALL CORE

CROSS-REFERENCE TO RELATED APPLICATIONS

This application is a divisional of application Ser. No. 09/894,240, filed Jun. 27, 2001 now abandoned, which is a continuation-in-part of application Ser. No. 09/883,423, filed Jun. 18, 2001 now U. S. Pat. No. 6,562,909, which is a continuation-in-part of application Ser. No. 09/775,793, filed Feb. 5, 2001 now U.S. Pat. No. 6,812,317, which is a continuation-in-part of application Ser. No. 09/625,544, filed Jul. 25, 2000 now U.S. Pat. No. 6,749,789, which is a continuation of application Ser. No. 09/207,690, filed Dec. 9, 1998, now U.S. Pat. No. 6,132,324, which is a divisional of application Ser. No. 08/863,788, filed May 27, 1997, now U.S. Pat. No. 5,885,172, the disclosures of which are all hereby incorporated by express reference thereto.

FIELD OF THE INVENTION

This invention relates generally to golf balls having a core and a cover, each having at least one layer, and, in particular, to a golf ball core comprising a blend of a polybutadiene-based material and a polybutadiene-based material pre-impregnanted with tungsten filler.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer and more durable than wound balls, but many solid constructions lack the "feel" provided by the wound construction.

More recently, by altering solid golf ball construction and composition, manufacturers have been able to vary a wide range of playing characteristics, such as compression, velocity, "feel," and spin, optimizing each or all as needed. In particular, a variety of core and cover layer constructions, such as multi-layer golf balls having dual cover layers and/or dual core layers, have been investigated and now allow many non-wound balls to exhibit characteristics previously unattainable in a solid-construction golf ball. These golf ball layers are typically constructed with a number of polymeric compositions and blends, including polybutadiene rubber, thermoplastic and thermoset materials, polyurethanes, polyamides, and ethylene-based ionomers.

The core of solid golf balls is the "engine" of the ball, providing the velocity required for good distance. Too hard a core, however, can result in a golf ball that provides poor "feel," particularly apparent when hit by an accomplished golfer. Manufacturers are constantly experimenting with various core compositions and constructions in an effort to optimize both feel and distance. Most conventional solid cores comprise polybutadiene rubber or some modified form thereof. For example, polybutadiene has a number of isomers (i.e., cis-, trans-, and vinyl-) or may contain a variety of filler materials (i.e., ZnO, W, or microspheres). When fillers, such as tungsten, are included, they are generally combined with the polybutadiene master batch just prior to the molding step. The result is a plethora of tungsten dust, an obvious hazard that also clogs golf ball molds and is difficult to clean.

It has been determined that, by adding tungsten (or other filler) to a second batch of polybutadiene rubber in concentrated amounts and subsequently blending the second batch, in a predetermined amount, with the master batch, tungsten can be added to the master batch in a non-hazardous manner.

SUMMARY OF THE INVENTION

The present invention is directed to a method of making a golf ball core comprising the steps of providing a first polybutadiene pre-impregnated with at least about 50 weight percent of a first filler; providing a second polybutadiene substantially free of the first filler; providing a free radical initiator and a crosslinking agent; mixing the second polybutadiene, the free radical initiator, and the crosslinking agent with the first polybutadiene to form a polybutadiene blend; and molding the polybutadiene blend into the golf ball core.

The step of molding includes compression molding or injection molding the reaction product into a solid sphere. Preferably, the first filler includes tungsten. In one embodiment, the first polybutadiene is pre-impregnated with at least about 80 weight percent of the first filler. A second filler may be added to the reaction mixture and, if so, is preferably present in an amount of less than about 5 percent by weight of the first polybutadiene.

In another embodiment, the method further includes the steps of applying heat and pressure to the blend; allowing the free radical initiator to decompose and initiate a reaction between the polybutadiene blend and the crosslinking agent; and allowing the crosslinking reaction to substantially complete during the step of molding.

Preferably, at least one of the first and second polybutadienes has a dynamic stiffness of less than about 50,000 N/m at −50° C., a loss tangent of less than about 0.1 at −50° C., or a resilience index of at least about 40 at 100° C. Alternatively, at least one of the first and second polybutadienes has a molecular weight of at least about 200,000 and a Mooney viscosity of about 40 to about 80. Additionally, at least one of the first and second polybutadienes has a first dynamic stiffness at −50° C. that is less than about 130 percent of a second dynamic stiffness at 0° C.

The method may further include the steps of providing a cis-to-trans catalyst; and mixing the cis-to-trans catalyst into the blend in an amount sufficient to increase substantially a trans-isomer content. The cis-to-trans catalyst should be present in an amount of from about 0.1 to about 8 parts per hundred of the polybutadiene blend. The trans-isomer content in the reaction product is at least about 5 percent. Ideally, the core has a first amount of trans-polybutadiene at an interior location, and a second amount of trans-polybutadiene at an outer surface location that is greater than the first amount by at least about 6 percent.

In still another embodiment, he core has a compression of from about 15 to about 100, or a deflection of about 3.3 mm to about 7 mm under a 130 kg-10 kg test, or both and/or has a specific gravity of greater than about 0.7. Preferably, the core has an outer diameter of at least about 1.51 inches and/or a hardness of from about 20 Shore C to about 85 Shore C at its geometric center. The geometric center of the core preferably has a first hardness, and an outer surface of the core has a second hardness that differs from the first hardness by greater than about 10 percent of the first hardness. The filler preferably includes a material having a specific gravity of between about 2 and about 20.

The present invention is also directed to a method of making a golf ball core comprising the steps of providing a first polybutadiene pre-impregnated with at least about 50 weight percent of tungsten; providing a second polybutadiene substantially free of tungsten; mixing the second polybutadiene with the first polybutadiene to form a polybutadiene blend; mixing a crosslinking agent, and a free radical initiator into the polybutadiene blend to form a reaction mixture; placing the reaction mixture into a mold cavity; and heating and pressurizing the reaction mixture to form the golf ball core. The step of mixing may further include a cis-to-trans catalyst.

The present invention is also directed to a method of making a golf ball comprising the steps of providing a first polybutadiene pre-impregnated with at least about 50 weight percent of a first filler; mixing a second polybutadiene, substantially free of the first filler, into the first polybutadiene to form a polybutadiene blend; mixing a cis-to-trans catalyst, a crosslinking agent, and a free radical initiator into the polybutadiene blend to form a reaction product; molding the reaction product into a golf ball core; and forming a cover layer about the core to produce the golf ball.

Preferably, the first polybutadiene consists of greater than about 80 percent filler, by weight and/or the second polybutadiene consists of less than about 5 percent filler by weight. Ideally, the second polybutadiene consists of between about 1 percent filler by weight and about 0.05 percent filler by weight. In one embodiment, at least one of the first or second polybutadiene has a Mooney viscosity of about 40 to about 80. Additionally, the first or second polybutadiene may have a first dynamic stiffness measured at −50° C. that is less than about 130 percent of a second dynamic stiffness measured at 0° C.

The cover layer may be formed by injection molding, compression molding, or casting a reactive liquid. The cover layer has a thickness of between about 0.05 inches and about 0.1 inches and a loss tangent of from about 0.03 to 0.08 between a temperature of −30° C. to 20° C. The cover layer has an elasticity and complex modulus of from about 5,000 to 12,000 kgf/cm$^2$ over a temperature of about −30° C. to 20° C. The cover layer comprises natural or synthetic balata material, thermoset and thermoplastic materials, ionomers, polyamides, polyureas, polyurethanes, and styrene-butadiene rubbers. The cover layer has a loss tangent of 0.16 to 0.075 over a range of −30° C. to 20° C. The cover layer has a complex modulus of from about 1000 to 2800 kgf/cm$^2$ from −30° C. to 20° C. The cover is an outer cover layer comprising polyurethane or polyurea.

DEFINITIONS

As used herein, substituted and unsubstituted "aryl" groups means a hydrocarbon ring bearing a system of conjugated double bonds, typically comprising 4n+2π ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. Compression values are dependent on the diameter of the article being measured. When the Atti Gauge is used to measure cores having a diameter of less than 1.680 inches, it should be understood that a metallic or other suitable shim is used to make the measured object 1.680 inches in diameter.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1-28 carbon atoms. The cyclic groups of the invention may further comprise a heteroatom.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "coefficient of restitution" ("COR") for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 µm. The probe dynamically penetrates the surface of a sample material. Material samples of spherical cores were prepared by sectioning out a 6-mm-thick layer along the equator of core to produce a disk 6-mm-thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-µm amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent. Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the term "fluid" includes a liquid, a paste, a gel, a gas, or any combination thereof.

As used herein, the term "Group VIA" means a component that includes a sulfur, selenium, tellurium, or a combination thereof.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, the term "molecular weight" is defined as the absolute weight average molecular weight.

As used herein, the term "multilayer" means at least two layers and includes fluid or liquid center balls, wound balls, hollow-center balls, and balls with at least two intermediate layers and/or cover layers.

As used herein, the term "parts per hundred," also known as "phr," is defined as the number of parts by weight of a particular component present in a mixture, relative to 100 parts by weight of the total polymer component.

As used herein the term "resilience index" is defined as the difference in loss tangent (tan™) measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index.

As used herein, the term "substantially free" means less than about 5 weight percent, preferably less than about 3 weight percent, more preferably less than about 1 weight percent, and most preferably less than about 0.01 weight percent.

As used herein, "flexural modulus" is measured by ASTM D6272-98, Procedure B, as modified, about two weeks after polymer formation.

As used herein, the term "stiffness" refers to the flexural modulus.

As used herein, "hardness" refers to the hardness of the material forming the particular layer of the ball being discussed, as measured by ASTM D2240-00. Hardness does not refer to the hardness measured on the golf ball.

DETAILED DESCRIPTION OF THE PREFERRED EMBODIMENTS

The present invention is directed to a golf ball core comprising a blend of a first polybutadiene-based material and a second polybutadiene-based material impregnated with a filler. Preferably the core comprises the tungsten-impregnated polybutadiene ("W-PB") of the present invention. In one embodiment, golf ball includes a core of one or more layers, such as a center and outer core layer, the center comprising the W-PB, a cover layer, and a layer disposed between the core and the cover. Optionally, the center is covered with a wound layer.

Thus, improved golf ball cores can be prepared according to the invention by including a blend of a first amount of polybutadiene or a reaction product thereof and a second amount of polybutadiene that has been pre-impregnated with tungsten or other filler; and disposing a cover including at least one layer, preferably including a polyurethane material, over the core or optional intermediate layer.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction.

Another measure of this resilience is the "loss tangent," or tan*, which is obtained when measuring the dynamic stiffness of an object. The rigidity or compressive stiffness of a golf ball may be measured, for example, by the dynamic stiffness. To produce golf balls having a desirable compressive stiffness, the dynamic stiffness of the polybutadiene should be less than about 50,000 N/m at −50° C. Preferably, the dynamic stiffness should be from about 10,000 to 40,000 N/m at −50° C., more preferably, the dynamic stiffness should be from about 20,000 to 30,000 N/m at −50° C. The polybutadiene preferably has a loss tangent below about 0.1 at −50° C., and more preferably below about 0.07 at −50° C.

The center composition preferably includes at least one rubber material having a resilience index of at least about 40. Preferably, the resilience index is at least about 50. A comparison of a number of polybutadiene polymers are listed in Table 1 below. Polymers that produce resilient golf balls and, therefore, are suitable for use in the center or other portions of a golf ball according to the present invention include, but are not limited to, CB23, CB22, BR60, and 1207G.

TABLE 1

Resilience Index of example polybutadiene polymers

| Rubber | Tan * at 10 cpm | Tan * at 1000 cpm | Resilience Index at 100° C. |
|---|---|---|---|
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |
| TAKTENE ® 8855 | 0.720 | 0.414 | 31 |
| CARIFLEX ® BR1220 | 0.487 | 0.439 | 5 |
| BUDENE ® 1207 G | 0.825 | 0.388 | 44 |

A suitable pre-impregnated polybutadiene-based material includes Poly-dispersion RD-1185P, commercially available from Rhein Chemie of Trenton, N.J. The second polybutadiene-based material preferably contains greater than about 50 percent filler, by weight, more preferably greater than about 70 percent filler, by weight, and most preferably greater than about 80 percent filler, by weight. In the most preferred embodiment, the filler is tungsten. The first polybutadiene-based material can include less than about 5 percent filler by weight, more preferably, less than about 1 percent filler by weight, and most preferably, less than about 0.05 percent filler by weight.

The golf ball core polybutadiene material, including W-PB, typically has a hardness of at least about 15 Shore A, preferably from about 30 Shore A to 80 Shore D, more preferably from about 50 Shore A to 60 Shore D. In one preferred embodiment, the core has a hardness of about 20 to 85 Shore C, preferably from about 40 to 80 Shore C, and more preferably from about 60 to 70 Shore C at the geometric center. The specific gravity is typically greater than about 0.7, preferably greater than about 1.0, for the golf ball polybutadiene material (including W-PB).

Additionally, the unvulcanized rubber, such as polybutadiene, in golf balls prepared according to the invention typically has a Mooney viscosity of about 40 to about 80, preferably from about 45 to about 60, and more preferably from about 45 to about 55. Mooney viscosity is typically measured according to ASTM D1646-99.

In another embodiment, at least one of the core center or outer layer includes a reaction product that includes a cis-to-trans catalyst, a first amount of polybutadiene, a second amount of polybutadiene including a filler, a free radical source, and a crosslinking agent. Preferably, the polybutadiene is used to form at least a portion of the center of the golf ball. Preferably, the polybutadiene has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

Thus, the invention also includes a method to convert the cis-isomer of the polybutadiene to the trans-isomer during a molding cycle and to form a golf ball. Various combinations of polymers, cis-to-trans catalysts, fillers, crosslinkers, and a source of free radicals, may be used. To obtain a higher resilience and lower compression center or intermediate layer, a high-molecular weight polybutadiene with a cis-isomer content preferably greater than about 90 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 95 percent of the total polybutadiene content. Without wishing to be bound by any particular theory, it is believed that a low amount of 1,2-polybutadiene isomer ("vinyl-polybutadiene") is desired in both the initial polybutadiene and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same. The W-PB may be blended with the master batch of polybutadiene rubber prior to, during, or after conversion takes place. In one embodiment, the second polybutadiene-based material (the W-PB) undergoes a cis-to-trans conversion as well.

In one embodiment the coefficient of restitution of the golf ball at a club head speed of 160 ft/s is at least about 0.76 and the magnitude of the gradient of the coefficient of restitution to an inbound velocity is at least about 0.001 s/ft.

The invention also relates to a golf ball having at least a center including a first polybutadiene and a second W-PB, each having a molecular weight of greater than about 300,000 and a resilience index of at least about 40, having an outer diameter of at least about 1.00 inches, an inner cover layer surrounding the optional outer core layer, and an outer cover layer disposed around the inner cover layer, the outer cover layer including a polyurethane composition formed from a prepolymer having less than 7.5 percent by weight unreacted isocyanate groups and the inner cover comprising polyisoprene. Preferably, the center has an outer diameter of at least about 1.51 inches, more preferably at least about 1.55 inches.

To produce a polymer reaction product that exhibits the higher resilience and lower modulus (lower compression) properties that are desirable and beneficial to golf ball playing characteristics, high-molecular-weight cis-1,4-polybutadiene, preferably may be converted to the trans-isomer during the molding cycle. "High-molecular weight" typically means that the polybutadiene material has a molecular weight average of greater than about 200,000. Preferably, the polybutadiene molecular weight is greater than about 250,000, more preferably from about 300,000 to 500,000. The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

In one embodiment, the at least one organosulfur component is substantially free of metal, which typically means less than about 10 weight percent metal, preferably less than about 3 weight percent metal, more preferably less than about 1 weight percent metal, and most preferably only trace amounts of metal, such as less than about 0.01 weight percent. In another embodiment, the organosulfur component is completely free of metal.

As used herein when referring to the invention, the term "organosulfur compound(s)" or "organosulfur component(s)," means at least one of 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound may also be included in the cis-to-trans catalyst. Suitable substituted or unsubstituted aromatic organic components include, but are not limited to, components having the formula $(R_1)_x\text{—}R_3\text{-M-}R_4\text{—}(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$-$R_4$ are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The cis-to-trans catalyst can also include a Group VIA component. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt. The cis-to-trans catalyst is typically present in an amount from about 0.1 to 10 parts per hundred of the total resilient polymer component. Preferably, the cis-to-trans catalyst is present in an amount from about 0.1 to 8 parts per hundred of the total resilient polymer component. More preferably, the cis-to-trans catalyst is present in an amount from about 0.1 to 5 parts per hundred of the total resilient polymer component. The cis-to-trans catalyst is typically present in an amount sufficient to produce the reaction product so as to increase the trans-polybutadiene isomer content to contain from about 5 percent to 70 percent trans-polybutadiene based on the total resilient polymer component.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 3,3,5-trimethyl cyclohexane, a-a bis(t-butylperoxy)diisopropylbenzene, 1,1-bis(t-butylperoxy)-3, 3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the polymer, and more preferably about 0.2 to 5 parts per hundred of the total polymer. It should be understood by those of ordinary skill in the art that the presence of certain cis-to-trans catalysts according to the invention may require a larger amount of free-radical source, such as the amounts described herein, compared to conventional cross-linking reactions. The initiator(s) at 100% activity are preferably added in an amount ranging from about 0.05 phr to 5 phr based upon 100 parts of polybutadiene. More preferably, the amount of initiator added ranges from about 0.15 phr to 4 phr, and most preferably from about 0.25 phr to 3 phr. The free radical source may alternatively or additionally be one or more of an electron beam, UV or gamma radiation, x-rays, or any other high energy radiation source capable of generating free radicals. It should be further understood that heat often facilitates initiation of the generation of free radicals.

A crosslinking agent is included to increase the hardness of the reaction product. Suitable crosslinking agents include one or more metallic salts of unsaturated fatty acids or monocarboxylic acids, such as zinc, aluminum, sodium, lithium, nickel, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is selected as the cis-to-trans catalyst, zinc diacrylate may be selected as the crosslinking agent and is preferably present in an amount of less than about 25 phr. Suitable, commercially available, zinc diacrylates include those from the Sartomer Corporation.

As used herein, the term "fillers" includes any compound or composition that can be used to adjust the density and/or other properties of the subject golf ball core. Fillers are typically polymeric or mineral particles. Exemplary fillers include precipitated hydrated silica; clay; talc; asbestos; glass fibers; aramid fibers; mica; calcium metasilicate; barium sulfate; zinc sulfide; lithopone; silicates; silicon carbide; diatomaceous earth; polyvinyl chloride; carbonates such as calcium carbonate and magnesium carbonate; metals such as titanium, tungsten, aluminum, bismuth, nickel, molybdenum, iron, lead, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; and combinations thereof. Fillers may be added at any point in the molding or blending process. In the most preferred embodiment, the filler, preferably tungsten, is added to a second amount of polybutadiene rubber prior to blending with the first amount of polybutadiene rubber to form the core.

The amount and type of filler utilized is governed by the amount and weight of other ingredients in the composition, since a maximum golf ball weight of 1.62 oz has been established by the United States Golf Association ("USGA"). Appropriate fillers generally used have a specific gravity from about 2 to 20. In one preferred embodiment, the specific gravity can be about 2 to 6. In one embodiment, the center material can have a specific gravity of about 1 to 5, preferably about 1.1 to 2.

Antioxidants may also optionally be included in the polybutadiene material in the centers produced according to the present invention. Antioxidants are compounds that can inhibit or prevent the oxidative degradation of the polybutadiene. Antioxidants useful in the present invention include, but are not limited to, dihydroquinoline antioxidants, amine type antioxidants, and phenolic type antioxidants.

Other optional ingredients, such as accelerators, e.g., tetramethylthiuram, peptizers, processing aids, processing oils, plasticizers, dyes and pigments, as well as other additives well known to those of ordinary skill in the art may also be used in the present invention in amounts sufficient to achieve the purpose for which they are typically used.

The polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds and temperatures for combining polymers are typically used. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle can be readily selected based upon the type of peroxide and cis-trans catalyst selected. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. Single-step processes are effective and efficient, reducing the time and cost of a two-step process.

The polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured polymer component, which contains a greater amount of trans-polybutadiene than the uncured polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere.

The compression of the core, or portion of the core, of golf balls prepared according to the invention is typically from about 15 to 100. In one embodiment, the compression is below about 50, more preferably below about 25. In a preferred embodiment, the compression is from about 60 to 90, more preferably from about 70 to 85. Various equivalent methods of measuring compression exist. For example, a 70 Atti compression is equivalent to a center hardness of 3.2 mm deflection under a 100 kg load and a "spring constant" of 36 kgf/mm. In one embodiment, the golf ball core has a deflection of about 3.3 mm to 7 mm under a 130 kg-10 kg test.

In one embodiment, the center includes a material formed from a conversion reaction of polybutadiene having a first amount of trans- isomer, a free radical source, and at least one cis-to-trans catalyst. In a preferred embodiment, the reaction occurs at a temperature and for a time sufficient to form a polybutadiene reaction product having a second amount of trans-isomer greater than the first amount of trans-isomer. In one embodiment, the cis-to-trans catalyst includes at least one of an organosulfur compound, an inorganic sulfur compound, an aromatic organometallic compound, a metal-organosulfur compound, tellurium, selenium, elemental sulfur, a polymeric sulfur, or an aromatic organic compound. Preferably, the catalyst includes an organosulfur component, and in one preferred embodiment the catalyst includes at least one of 4,4'-diphenyl disulfide, 4,4'-ditolyl disulfide, or 2,2'-benzamido diphenyl disulfide, or a combination thereof. The cis-to-trans catalyst is typically present in an amount from about 0.1 to 10 parts per hundred of polybutadiene. In a most preferred embodiment, the center also includes a second amount of W-PB.

Preferably, the core has an outer diameter of at least about 1.0 inch, more preferably about 1.3 to 1.6 inches, most preferably from about 1.55 inches to about 1.6 inches. As stated above, the outer layer may be formed of windings of at least one thread. In this case, the center diameter is preferably at least about 1.4 inches.

Thread materials including polyisoprene, polyether urea, polyester, polyethylene, polypropylene, or combinations thereof may be used with the present invention. Threads used in the present invention may be formed using a variety of processes including conventional calendering and slitting. Furthermore, processes such as melt spinning, wet spinning, dry spinning or polymerization spinning may also be used to provide threads. Other useful polymers include poly(olefins), aliphatic polyamides, and aromatic polyesters, all of which are suitable thread materials.

Threads formed of multiple strands can also be prepared according to the invention by reference to U.S. Pat. No. 6,149,535, the disclosure of which is hereby incorporated herein by express reference thereto.

The thread preferably includes a polymeric material. Suitable polymers include polyether urea, such as LYCRA®; polyester urea; polyester block copolymers, such as HYTREL®; isotactic-poly(propylene); polyethylene; polyamide; poly(oxymethylene); polyketone; poly(ethylene terephthalate); such as DACRON®; poly(p-phenylene terephthalamide); such as KEVLAR®; poly(acrylonitrile); such as ORLON®; trans-diaminodicyclohexylmethane and dodecanedicarboxylic acid, such as QUINA®. LYCRA®, HYTREL®, DACRON®, KEVLAR®, ORLON®, and QUINA® are available from E.I. DuPont de Nemours & Co. of Wilmington, Del. Glass fiber and, for example, S-GLASS® from Corning Corporation can also be used. Also, D7 Globe thread by Globe Manufacturing of Fall River, Mass. can be used. Indeed, a mixture of any of the thread materials discussed herein can be included in a thread layer of the invention.

A golf ball of the present invention can also be formed by initially forming a shell by compression molding hemispherical cups, the cups are bonded together to form the shell to create a cavity and filling the cavity with fluid or liquid to form a fluid filled center. In one embodiment, the shell is covered by a solid layer. In another embodiment, a thread can then be wound directly around the shell to form the wound layer as previously described if there are no additional layers desired between the center and wound layer; otherwise, the intermediate layer(s) are formed around the shell before the tensioned material is disposed about the center layers. The cover can then be disposed about the wound layer.

Properties that are desirable for the cover are good moldability, high abrasion resistance, high tear strength, high resilience, and good mold release, among others. The cover typically has a thickness to provide sufficient strength, good performance characteristics and durability. The cover preferably has a thickness of less than about 0.1 inches, more preferably, less than about 0.05 inches, and most preferably, from about 0.01 to about 0.04 inches. In another embodiment, the outer cover layer is less than 0.02 inches and preferably less than 0.01 inches. The invention is particularly directed towards a multilayer golf ball that includes a core, an inner cover layer, and an outer cover layer. In this embodiment, preferably, both the inner and outer cover layers has a thickness of less than about 0.05 inches, more preferably the thickness of each cover layer is from about 0.02 to about 0.04 inches.

In the embodiment with an inner and outer cover layers, the inner cover layer can be prepared as follows. Although injection or compression molding, or casting, can be used, in one preferred embodiment the inner cover is formed over the core by using compression molding. A suitable speed for increasing the pressure to close the molds around the cores can be readily determined. Thus, a time on the order of greater than 1 second to about 30 seconds, preferably 2 seconds to 20 seconds may be suitable depending on other process conditions and the materials involved. In one preferred embodiment, a time of about 10 to about 15 seconds is most suitable for closing the mold. It should be understood that this time is measured from when each half of the mold is in contact with the polyisoprene material there between and relates to the time over which the pressure on the molds and centers is increased to fully close the molds. This method advantageously helps inhibit or avoid weld lines that can occur using injection molding methods.

The inner cover may be made of any natural or synthetic balata material, i.e., trans-polyisoprene, blends of balata with other materials, or similar materials that may be molded about a core including the first polybutadiene-based material and the second W-PB of the present invention, thermoset and thermoplastic materials, ionomers, polyamides, polyureas, and polyurethanes. In one embodiment, compression molding is used to form the inner cover layer. In one embodiment, the inner cover may also contain styrene-butadiene rubber ("SBR") or SBR-reinforced resin, for example, available as PLIOLITE® from Goodyear Tire & Rubber Co. of Akron, Ohio as a stiffener, and one or more fillers to adjust the specific gravity. Suitable fillers include those described herein. Preferred fillers are those that have a small particle size and high specific gravity, such as tungsten. The inner cover may, but is not required to be, vulcanized as it is applied to the wound core, or in a post molding step. The outer surface of the inner cover layer may be treated prior to application of the outer cover, by one or more of halogenation, chemical surface modification or treatment (i.e., silane coupling agents), UV radiation, electron beam exposure, microwave radiation, coating (via spray, dip, or electrostatic application), plasma, or corona discharge, as described in co-pending U.S. patent application Ser. No. 09/389,058, which is incorporated herein by express reference thereto. Preferably, the treatment will increase adhesion of the inner cover layer to the outer cover. The treatment may be used to activate a material compounded into the base material which will have the same preferred interaction with the outer cover to facilitate, for example, adhesion. The treatment may further be used to activate a material such that the softening point of the base material is increased, improving the temperature stability of the final product.

For a ball having a diameter of 1.68 inches, the outer diameter of the inner cover layer, if present, is preferably from about 1.55 inches to 1.67 inches. In one embodiment, the outer diameter is from about 1.6 inches to about 1.64 inches. An exemplary inner cover layer outer diameter is 1.62 inches. In another embodiment, the outer diameter is between about 1.66 and about 1.67 inches. The inner cover layer preferably has a thickness of about 0.01 inches to 0.1 inches, preferably about 0.02 inches to 0.05 inches. In one preferred embodiment, the thickness of the inner cover layer is about 0.03 inches to 0.04 inches. In another embodiment, the inner cover is between 0.05 and 0.09 inches. In one preferred embodiment, the inner cover layer has a hardness of about 20 to 80 Shore D, preferably about 50 to 75 Shore D, and more preferably about 52 to 64 Shore D when measured on the core. The compression of the core and inner cover layer is typically from about 20 to 100, preferably from about 30 to 75. In one preferred embodiment, the core and inner cover layer compression is from about 40 to 70. In one embodiment, the inner cover layer has a specific gravity of about 0.8 to 1.3, preferably about 0.9 to 1.2. The loss tangent of the inner cover layer can, in one embodiment, be from about 0.03 to 0.08 from a temperature of about −30° C. to 20° C. The elasticity and complex modulus of the inner cover layer can be from about 5,000 to 12,000 kgf/cm$^2$ over a temperature of about −30° C. to 20° C.

The cover layer, or outer cover layer, can include any materials known to those of ordinary skill in the art, including thermoplastic and thermosetting materials, but preferably the cover layer can include any suitable materials, such as:

(1) Polyurethanes, such as those prepared from polyols and diisocyanates or polyisocyanates and those disclosed in U.S. Pat. No. 5,334,673; and
(2) Polyureas, such as those disclosed in U.S. Pat. No. 5,484,870.

The cover preferably includes a polyurethane composition comprising the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, i.e., as part of a prepolymer and in the curing agent. The polyurethane composition may be used in forming the inner cover, outer cover, or both. In one preferred embodiment, the outer cover includes the polyurethane composition.

In a different preferred embodiment, the curing agent includes a polyol curing agent. In a more preferred embodiment, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; trimethylol propane, or mixtures thereof.

In one embodiment, the polyurethane composition includes at least one isocyanate and at least one curing agent. In yet another embodiment, the polyurethane composition includes at least one isocyanate, at least one polyol, and at least one curing agent. In a preferred embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. In another preferred embodiment, the at least one polyol includes a polyether polyol, hydroxy-terminated polybutadiene, polyester polyol, polycaprolactone polyol, polycarbonate polyol, or mixtures thereof. In yet another preferred embodiment, the curing agent includes a polyamine curing agent, a polyol curing agent, or a mixture thereof. In a more preferred embodiment, the curing agent includes a polyamine curing agent. In a most preferred embodiment, the polyamine curing agent includes 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); or mixtures thereof.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1, 12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; naphthalene diisocyanate; anthracene diisocyanate; and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, from about 2.5% to about 7.5%, and most preferably, from about 4% to about 6.5%.

Any polyol available to one of ordinary skill in the art is suitable for use according to the invention. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE® 300. Suitable polyamine curatives, which include both primary and secondary amines, preferably have weight average molecular weights ranging from about 64 to about 2000.

At least one of a diol, triol, tetraol, or hydroxy-terminated curative may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl)ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of the filler component is dependent upon the characteristics of the golf ball desired. Examples of fillers for use in the filler component of the polyurethane include those described herein for the polybutadiene reaction component. Similar or identical additives, such as nanoparticles, fibers, glass spheres, and/or various metals, such as titanium and tungsten, can be added to the polyurethane compositions of the present invention, as well, in amounts as needed to modify one or more golf ball properties. Additional components that can be added to the polyurethane composition include UV stabilizers and other dyes, as well as optical brighteners and fluorescent pigments and dyes. Such additional ingredients may be added in any amounts that will achieve their desired purpose.

Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated herein in its entirety by express reference thereto.

The cover, or the outer cover if both inner and outer cover layers are present, is preferably formed around the core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urethane mix for introducing cores into the mold halves is determined to be approximately from about 2,000 cP to about 30,000 cP, with the preferred range of about 8,000 cP to about 15,000 cP.

To start the cover formation, mixing of the prepolymer and curative can be accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 10 to about 80 seconds, a core is lowered at a controlled speed into the gelling reacting mixture. At a later time, a bottom mold half or a series of bottom mold halves have similar mixture amounts introduced into the cavity.

A ball cup can hold the ball core through reduced pressure (or partial vacuum) in hose. Upon location of the coated core in the halves of the mold after gelling for about 10 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. The disclosures of each patent is hereby expressly incorporated herein by express reference thereto. The method of the invention, however, is not limited to the use of these techniques.

In one embodiment, the cover typically has a loss tangent of 0.16 to 0.075 from −30° C. to 20° C. In one embodiment, the complex modulus of the cover layer on the ball is from about 1000 to 2800 kgf/cm$^2$ from −30° C. to 20° C. In one embodiment, the specific gravity of the cover material is from about 1 to 2, preferably from about 1.1 to 1.4. In one preferred embodiment, the cover material has a specific gravity of about 1.15 to 1.25.

When golf balls are prepared according to the invention, they typically will have dimple coverage greater than about 60 percent, preferably greater than about 65 percent, and more preferably greater than about 75 percent. The flexural modulus of the cover on the golf balls is typically greater than about 500 psi, and is preferably from about 500 psi to 80,000 psi.

As discussed herein, the outer cover layer is preferably formed from a relatively soft polyurethane material. In particular, the material of the outer cover layer should have a material hardness, as measured by ASTM D2240-00, from about 20 to about 60 Shore D, preferably from about 30 to about 50 Shore D. In one embodiment, the material hardness of the outer cover material is about 45 Shore D. When the hardness of the outer cover material is measured directly on the golf ball, the values tend to be higher than then the material hardness. In one embodiment, the outer cover hardness, as measured on the golf ball, is from about 45 to about 60 Shore D. The inner cover layer, preferably has a material hardness of about 50 to about 70 Shore D, more preferably from about 60 to about 65 Shore D. In an alternative embodiment, the inner cover layer has a hardness, when measured on the golf ball, of about 45 to about 64 Shore D.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100.

The core material of the present invention may also used in golf equipment and, in particular, polymeric inserts for golf clubs such as putters, drivers, and irons, and golf shoe components, such as soles and uppers.

The term "about," as used herein in connection with one or more numbers or numerical ranges, should be understood to refer to all such numbers, including all numbers in a range.

While it is apparent that the illustrative embodiments of the invention herein disclosed fulfills the objectives stated above, it will be appreciated that numerous modifications and other embodiments may be devised by those of ordinary skill in the art. For example, the present invention could use more than one thread where the threads are chemically, physically or mechanically distinct from each other. Therefore, it will be understood that the appended claims are intended to cover all such modifications and embodiments which come within the spirit and scope of the present invention.

What is claimed is:

1. A method of making a golf ball core comprising the steps of:
   providing a first polybutadiene pre-impregnated with at least about 50 weight percent of tungsten;
   providing a second polybutadiene substantially free of tungsten;
   mixing the second polybutadiene with the first polybutadiene to form a polybutadiene blend;
   mixing a crosslinking agent, and a free radical initiator into the polybutadiene blend to form a reaction mixture;
   placing the reaction mixture into a mold cavity;
   heating and pressurizing the reaction mixture to form the golf ball core.

2. The method of claim 1, wherein the step of mixing further includes a cis-to-trans catalyst.

3. A method of making a golf ball comprising the steps of:
   providing a first polybutadiene pre-impregnated with at least about 50 weight percent of a first filler;
   mixing a second polybutadiene, substantially free of the first filler, into the first polybutadiene to form a polybutadiene blend;
   mixing a cis-to-trans catalyst, a crosslinking agent, and a free radical initiator into the polybutadiene blend to form a reaction product;
   molding the reaction product into a golf ball core; and
   forming a cover layer about the core to produce the golf ball.

4. The method of claim 3, wherein the first polybutadiene consists of greater than about 80 percent filler, by weight.

5. The method of claim 3, wherein the second polybutadiene consists of less than about 5 percent filler by weight.

6. The method of claim 5, wherein the second polybutadiene consists of between about 1 percent filler by weight and about 0.05 percent filler by weight.

7. The method of claim 3, wherein at least one of the first or second polybutadiene has a Mooney viscosity of about 40 to about 80.

8. The method of claim 3, wherein the first or second polybutadiene has a first dynamic stiffness measured at −50° C. that is less than about 130 percent of a second dynamic stiffness measured at 0° C.

9. The method of claim 3, wherein the cover layer is formed by injection molding, compression molding, or casting a reactive liquid.

10. The method of claim 3, wherein the cover layer has a thickness of between about 0.05 inches and about 0.1 inches.

11. The method of claim 3, wherein the cover layer has a loss tangent of from about 0.03 to 0.08 between a temperature of −30° C. to 20° C.

12. The method of claim 3, wherein the cover layer has an elasticity and complex modulus of from about 5,000 to 12,000 kgf/cm$^2$ over a temperature of about −30° C. to 20° C.

13. The method of claim 3, wherein the cover layer comprises natural or synthetic balata material, thermoset and thermoplastic materials, ionomers, polyamides, polyureas, polyurethanes, and styrene-butadiene rubbers.

14. The method of claim 3, wherein the cover layer has a loss tangent of 0.16 to 0.075 over a range of −30° C. to 20° C.

15. The method of claim 14, wherein the cover layer has a complex modulus of from about 1000 to 2800 kgf/cm$^2$ from −30° C. to 20° C.

16. The method of claim 3, wherein the cover is an outer cover layer comprising polyurethane or polyurea.

* * * * *